H. P. KRAFT.
PACKING WASHER FOR CAPS OR THE LIKE.
APPLICATION FILED FEB. 20, 1915.

1,354,201.

Patented Sept. 28, 1920.

WITNESSES:
René Bruine
Ethel C. Nelson

INVENTOR
Henry Phillip Kraft,
By Attorneys,
Fraser, Turk & Myers

UNITED STATES PATENT OFFICE.

HENRY PHILLIP KRAFT, OF RIDGEWOOD, NEW JERSEY.

PACKING-WASHER FOR CAPS OR THE LIKE.

1,354,201.  Specification of Letters Patent.  Patented Sept. 28, 1920.

Application filed February 20, 1915. Serial No. 9,537.

*To all whom it may concern:*

Be it known that I, HENRY PHILLIP KRAFT, a citizen of the United States of America, and residing in Ridgewood, in the county of Bergen and State of New Jersey, U. S. A., have invented certain new and useful Improvements in Packing-Washers for Caps or the like, of which the following is a specification.

This invention relates to packing washers which are primarily intended for caps for pneumatic tires, although the invention is susceptible of use in other connections.

In the use of valves for pneumatic tires and analogous purposes it is customary to provide a cap which screws on the extreme end of the valve casing and is adapted to provide an additional seal for the valve in case of leakage through the valve parts, and in addition to exclude dust, moisture, etc. from the interior of the valving casing. Such caps are customarily provided with a packing of rubber which is carried on the interior of the cap and which is designed to engage the mouth of the valve casing. Such packing washers are necessarily small and consequently liable to distortion in use especially when the cap is screwed on to its seat with considerable force. The distortion of the packing interferes with its efficiency and in the case of the common form of valve its inward distortion is often sufficient to cause it to engage the deflating pin of the valve thus opening the latter. This is particularly true in that type of washer which is formed as a dome shaped member having a recess which is designed to receive the end of the valve stem, which customarily projects above the upper end of the valve casing.

According to the present invention I provide such a dome-shaped packing having a stiffening or strengthening member which is also preferably dome-shaped and is fixed throughout to the washer and which tends to minimize distortion of the latter, thus preventing the disadvantageous results above-referred to. Preferably the stiffening member is vulcanized to or embedded in the packing.

In the drawings wherein is illustrated one form of the invention—

Figure 2:
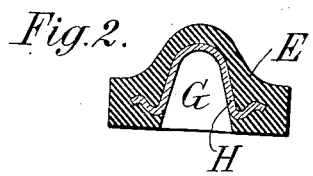
Fig. 2 is an enlarged diametrical section of the washer.

Referring to the drawings let A indicate a valve cap of the well-known Schrader type which is constructed of sheet metal in such manner as to leave a clear passage through it, the outer end B of the cap constituting a screw driver projection which is adapted to engage the interior valve parts for the purpose of removing them from the casing. Between the screw driver projection B and the screw threaded body portion C of the cap is a somewhat enlarged chamber D designed to receive the packing washer E which in the construction shown is dome shaped as best illustrated in Fig. 2. It is usual to provide a sheet metal cup F between the packing and the cap which constitutes an anti-friction device whereby when the cap is screwed on the valve casing the cap may rotate without rotating the packing so as to avoid torsional strains on the packing. When the cap A is constructed as shown, that is with a clear passage through it, the washer E and cup F are imperforate so as to prevent flow of air through the cap.

Figure 1:
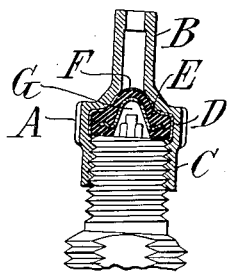
Figure 1 is a diametrical section of a valve cap having a washer provided with the present invention, the cap being shown as applied to the end of a valve.
Figure 4:
Fig. 4 is a perspective view of the metal strengthening member.

The valve casing is indicated in Fig. 1, and it will be observed that its upper edge contacts with the lower face of the packing washer near the outer edge of the latter. It will also be observed that the deflating pin of the valve extends upwardly beyond the end of the casing and to accommodate this pin the packing washer is recessed at G, there being a corresponding projection on the upper side of the washer. The particular shape of the recess and projection are not essential. The packing washer E as before stated frequently becomes distorted to such extent as to be inefficient and so as to engage the valve stem and open the valve when the cap is applied. According to the present invention the washer is stiffened or strengthened so as to oppose any tendency to undue distortion. This may be done in various ways, but it is preferred to use a metallic member H which is fixed throughout to the washer, preferably by being either vulcanized to or embedded in the rubber of the packing as best shown in Fig. 2. The stiffening member H is preferably of dome shape and corresponding generally to the shape of the washer. This form of stiffening member is illustrated in perspective in Fig. 4.

Figure 3:
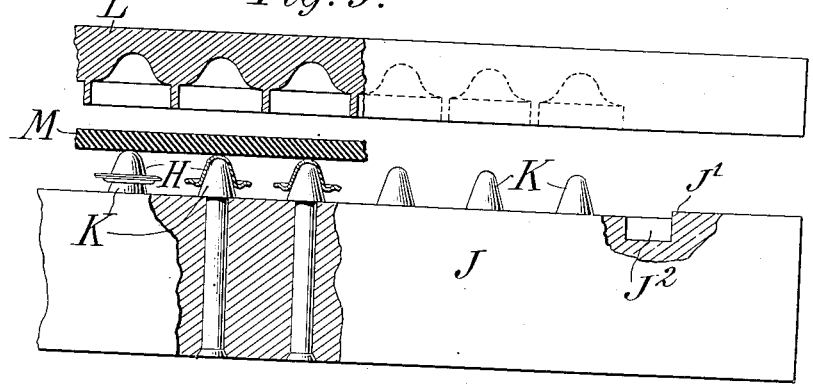
Fig. 3 is a view partly in section and somewhat diagrammatical in form illustrating the method of forming the washer.

The device may be constructed in any convenient manner, but the apparatus illustrated in Fig. 3 has been found to be suitable for the purpose.

In Fig. 3 J represents a plate having a series of pins K of dome shaped formation. The plate J and projections form the lower part of a mold, the upper part being indicated by the reference letter L. In practice the members H are placed upon the tops of the projections K and a sheet of unvulcanized or partly vulcanized rubber M is placed on top of the series of projections, the upper die L being then forced downwardly. The lower die J is formed with a shoulder J' which limits the downward movement of the die L and adjacent to the shoulder is a recess J² which extends around the mold and into which the surplus rubber flows. The parts of the mold are heated during this operation and are continued in heated condition for 25 or 30 minutes, the result being that the body of the rubber flows around the caps H, and is molded into a series of caps connected together by a web of rubber. When the vulcanizing operation is finished the washers are cut from the web and present the appearance of Fig. 2. The caps H are preferably partly embedded in the packing although they may be only vulcanized thereto. In any event sufficient rubber should be exposed at the lower face of the packing to constitute a proper seal for the valve casing.

While the invention has been described in connection with a packing for tire valve caps, it will be understood that it is not limited thereto as it may be utilized in connection with packings for other devices.

While the preferred form of the invention has been shown and described it will be understood that various changes may be made therein without departing from the spirit of the invention.

I have not claimed herein the method herein disclosed, since this forms the subject of a divisional application heretofore filed by me.

What I claim is:—

1. A dome-shaped packing washer having a central recess for receiving a valve pin, and having a dome-shaped member of stiffening material fixed throughout thereto.

2. A dome shaped packing washer having a dome shaped member of stiffening material embedded therein.

3. A dome shaped packing washer having a central cavity, and a dome shaped metal member embedded in said washer.

4. A cap having a dome-shaped packing washer in its interior having a central recess facing the open end of the cap, said dome-shaped packing washer having a dome-shaped stiffening member fixed throughout thereto.

5. A cap having a dome shaped packing washer in its interior, said dome shaped packing washer having a dome shaped stiffening member embedded therein.

6. A cap for valves or the like having a dome-shaped packing washer, said packing washer having a central recess on its under side adapted to receive a valve pin, and a seating face at its lower edge, and having a dome-shaped stiffening member, said stiffening member having a portion embedded therein, and extending substantially parallel to the seating face of the washer and located above such seating face, whereby the washer is compressible between said stiffening member and said seating face.

7. A cap for valves or the like having a dome-shaped packing washer, said packing washer having a central recess on its under side adapted to receive a valve pin, and a seating face at its lower edge, and having a stiffening member, said stiffening member having a portion embedded therein, and extending substantially parallel to the seating face of the washer and located above such seating face, whereby the washer is compressible between said stiffening member and said seating face, and said stiffening member having a portion above said parallel portion and arranged at the interior surface of the packing washer.

8. A cap having a dome-shaped packing washer in its interior, said dome-shaped packing washer having a stiffening member fixed thereto, and an anti-friction device between said washer and said cap.

9. A packing washer having a dome-shaped stiffening member, the packing washer having a lower seating face and the dome-shaped stiffening member having a flange embedded in the packing washer, said flange lying substantially parallel with the seating face of the washer.

In witness whereof I have hereunto signed my name in the presence of two subscribing witnesses.

HENRY PHILLIP KRAFT.

Witnesses:
THOMAS F. WALLACE.
FRED WHITE.